March 26, 1940. W. H. CHURCHILL 2,194,847
DOUBLE SNAP FASTENER AND INSTALLATION THEREOF
Filed June 26, 1937
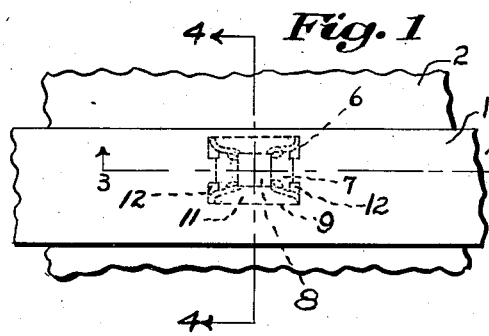
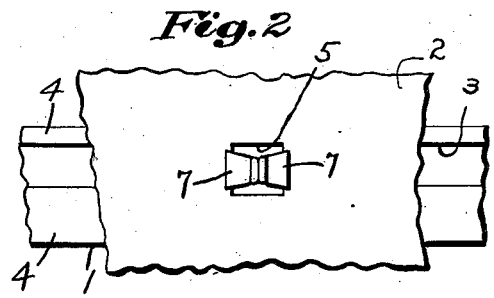
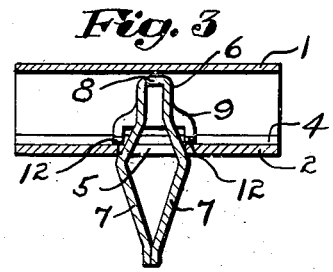
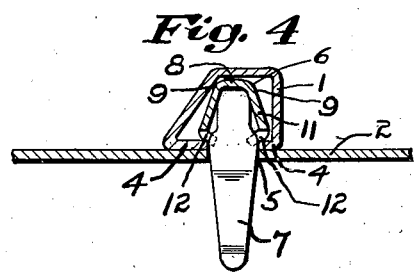
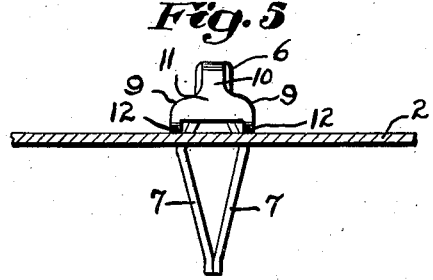
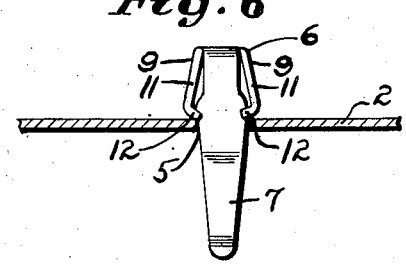
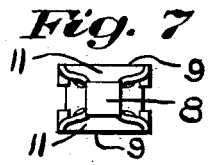
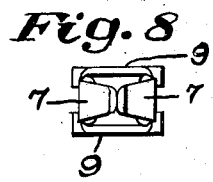
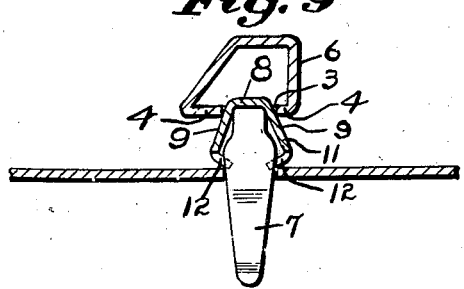
Inventor:
Wilmer H. Churchill.
by Walter S. Jones
Att'y.

Patented Mar. 26, 1940

2,194,847

UNITED STATES PATENT OFFICE 2,194,847

DOUBLE SNAP FASTENER AND INSTALLATION THEREOF

Wilmer H. Churchill, Saugus, Mass., assignor to United-Carr Fastener Corporation, Cambridge, Mass., a corporation of Massachusetts Application June 26, 1937, Serial No. 150,560

2 Claims. (Cl. 24—73)

My invention relates to snap fastener installations of the type designed for fastening two apertured bodies together and to double snap fastener members for the same.

In the drawing, in which I have illustrated a preferred embodiment of my invention:

Figure 1 is a front elevation of a molding strip secured to a supporting structure, the fastener member being shown in dotted lines;

Fig. 2 is a rear elevation of the installation shown in Fig. 1;

Fig. 3 is a section taken along the line 3—3 of Fig. 1;

Fig. 4 is a section taken along the line 4—4 of Fig. 1;

Fig. 5 is a side elevation of my improved snap fastener member secured to a supporting structure and in position to receive another apertured member;

Fig. 6 is a view of the installation shown in Fig. 5 but with the installation turned 45°;

Fig. 7 is a top view of my fastener member per se;

Fig. 8 is a bottom view of my fastener member per se; and

Fig. 9 is a view similar to that of Fig. 6 but showing a molding strip in position to be snapped over the head of the fastener member whereby it may be attached to the supporting structure.

My invention, as illustrated in the accompanying drawing, relates particularly, though not exclusively, to a fastener-secured installation in which hollow moldings and the like are quickly and easily attached to a supporting structure, such as an automobile body, by means of my improved double snap fastener member. The particular installation shown in the drawing which I have chosen to illustrate the use of my improved fastener member comprises an apertured supported member 1 such as a hollow molding of the type which is now frequently used on the bodies of automobiles and elsewhere and a relatively thin supporting structure 2. It should be understood, however, that my fastener members may be satisfactorily used for attaching other parts together than those specifically illustrated in the drawing. The supported member 1 is, in my preferred form, in the form of a channel-shaped molding strip having an aperture 3 running longitudinally of one of its sides and inwardly-bent flanges 4—4 provided adjacent the aperture 3. The supporting structure 2, which is preferably of thin metal material, is provided with an aperture 5 to receive stud means of my fastener member. The aperture 5, in my preferred form, is rectangular in shape (Fig. 2).

Referring to my preferred form of fastener member, I have provided a simple and sturdy double snap fastener member 6 which is preferably formed of one piece of spring metal. My fastener member has a socket-engaging means comprising a pair of oppositely-arranged yieldable legs 7—7 shaped to provide opposed diverging portions and converging portions for making snap fastener engagement with an aperture 5 of the support 2. The legs 7—7 preferably have opposed broad tapering faces, as most clearly shown in Figs. 2 and 8, with the width of each leg at points adapted to lie within the aperture 5 of the support 2, after the fastener has been secured thereto, substantially equal to the width of the aperture 5 so as to prevent lateral movement of the fastener. The legs 7—7, in my preferred form, are joined at their ends opposed to their leading ends by a connecting portion 8, as most clearly shown in Fig. 3. A pair of oppositely-arranged snap fastener portions 9—9 are provided at that end of the fastener to which the legs 7—7 are connected and are shaped to pass through the aperture 3 of the molding 1 and engage the flanges 4—4 of the molding in a manner which will be described. Each of the portions 9—9 has a neck portion 10 (Fig. 5) integral with a free edge of the connecting portion 8 between the legs 7—7. At the free end of each of the neck portions 10 I have provided an integral camming portion 11 which is of greater width than the neck portion. The camming portions 11—11 extend away from the connecting portion in diverging relation to each other. At the free end of the camming portion of each of the portions 9—9 I have provided a pair of lugs 12—12. The lugs 12—12 of each of the portions 9—9 converge relative to each other, as most clearly shown in Figs. 4 and 5, so as to provide shoulder means for engagement with the flanges 4—4 of the hollow molding. The lugs 12—12 of each of the portions 9—9 are disposed outside the planes of the outer broad surfaces of the legs 7—7 so that the legs 7—7 do not interfere with proper contraction and expansion of the portions 9—9.

As the result of the particular formation of my fastener member I have provided a pair of yieldable shouldered portions adapted to extend through the aperture 5 of the supporting structure 2 for securing the fastener member thereto, and a pair of yieldable shouldered portions adapted to engage the inwardly-extending flanges 4—4 of the hollow molding 1 for attaching the molding to the support. Assembly of the component parts of the installation is a relatively simple matter and is preferably carried out by first snapping the legs 7—7 of the fastener member through the aperture 5 of the supporting structure 2. After the fastener member has been attached to the supporting structure 2, the outermost free ends of the converging lug portions 12 of the snap fastener portions 9—9 may engage material of the upper surface of the supporting structure 2 adjacent the aperture 5, as most clearly shown in Fig. 6. Although I have shown only one fastener member secured to the supporting structure 2, it is understood that as many fastener members may be provided as are necessary for securing the molding 1 thereto. In assembling the hollow molding with the fastener member the inwardly-extended flanges 4—4 are moved into engagement with the camming portions 11—11, as shown in Fig. 9, and direct downward pressure is exerted upon the top of the molding so as to force the flanges 4—4 over the camming portions 11—11 by a snap action. This snap action is accomplished through natural resiliency of the portions 9—9 which, it will be noticed, move back and forth in a plane which is substantially transverse to the plane of the line of movement of the legs 7—7. After the molding has been attached to the support, portions of the flanges 4—4 are disposed between the converging outer surfaces of the respective lug portions 12—12 and the upper surface of the support 2, as most clearly shown in Fig. 4, and are tightly held in position so that a rigid assembly of the parts is provided when the installation is complete.

As a result of my invention I have provided a double snap fastener providing a simple and inexpensive means for quickly securing an apertured member, such as a hollow molding, to a supporting plate. It will be apparent that the size and shape of my improved fastener member could be modified slightly so as to enable the fastener to be secured to supports of varying thicknesses and it is further apparent that parts other than the specific hollow molding illustrated and described could be snapped over the shoulders provided by the fastener.

Although I have illustrated and described a preferred form of my invention, I do not wish to be limited thereby because the scope of my invention is best defined in the following claims.

I claim:

1. A double snap fastener for securing an apertured member to an apertured support, said fastener member being formed from a single piece of metal and having a pair of opposed leg portions, said legs being receivable through an aperture of said support when the fastener is assembled with the support and having shoulders for engagement with the inner face of said support, a connecting portion joining said legs at one end of said fastener, and opposed flexible portions integrally joined to opposite edges of said connecting portion, said flexible portions having diverging portions and converging portions providing shoulders, said flexible portions being receivable through an aperture of said member on contraction of said flexible portions, and said flexible portions expanding to engage said member to secure said member to said support.

2. A double snap fastener for securing an apertured member to an apertured support, said fastener member being formed from a single piece of metal and having a pair of opposed leg portions, said legs being receivable through an aperture of said support when the fastener is assembled with the support and having shoulders for engagement with the inner face of said support, a connecting portion joining said legs at one end of said fastener, and opposed flexible portions integrally joined to opposite edges of said connecting portion, said flexible portions having portions diverging away from each other in the direction of said legs, and lug portions at the ends of said diverging portions away from said connecting portion in converging opposite relation providing shoulders, said flexible portions being receivable through an aperture of said member on contraction of said flexible portions, and said flexible portions expanding to engage said member to secure said member to said support.

WILMER H. CHURCHILL.